United States Patent Office 3,626,760
Patented Dec. 14, 1971

3,626,760
LEAK DETECTION CYCLIC PUMPING CONTROL
Walton E. Briggs, Lynnfield, and Paul R. Fruzzetti, North Easton, Mass., assignors to Varian Associates, Palo Alto, Calif.
Filed July 16, 1969, Ser. No. 842,169
Int. Cl. G01m 3/00
U.S. Cl. 73—40.7
19 Claims

ABSTRACT OF THE DISCLOSURE

Mass spectrometer leak detector (or vacuum apparatus) generally controlled in its pumping cycles by solenoid operated roughing and isolation valves and utilizing roughing line suction for effective operation of the roughing valve in opening and sealing. The roughing valve is also used for test port air release in conjunction with sealing of the roughing valve per se. Automatic, pressure-responsive, control of the system is provided to allow complete control of pump-down, test air release and stand-by phases of a single cycle using a single electrical switch.

---

The present invention relates generally to vacuum pumped systems and specifically to vacuum apparatus known as a leak detector. It comprises an improved vacuum system having general application and having distinctly advantageous application as a leak detector and also comprises a distinctly advantageous valve assembly subcombination thereof.

BACKGROUND

The copending application of Briggs, Ser. No. 747,505, filed July 25, 1968 discloses a leak detector in which the test port is connected between the diffusion pump exit and backing mechanical pump inlet. That application disclosed a sequence of pumping and test steps and a vacuum pumped system for accomplishing the purposes of the invention. In selecting an optimum vacuum system for use with the Briggs invention it was recognized as desirable to provide a very simple, economical and lightweight valve assembly to complement the simplicity, economy and lightweight introduced by Briggs invention, per se. State of the art systems were found to be inadequate for these purposes.

OBJECT

It is an object of the invention to provide a vacuum system with a simple reliable control of its rough vacuum pumping functions including pumpdown, air release and isolation and automatic control of such functions.

It is a further object of the invention to provide a leak detector system with repetitive vacuum pumping operations utilizing the foregoing vacuum system to distinct advantage.

It is a further object of the invention to provide vacuum valving through the servo controlled use of the line vacuum.

It is a further object of the invention to provide reduction in weight and/or cost in the above classes of subject matter.

It is a further object of the invention to provide the foregoing in a simple to operate apparatus.

GENERAL DESCRIPTION

The basic leak detection task is to connect [1] a test port to a site of potential leak, use a rough pump to evacuate the site to rough vacuum level ($10^{-3}$ torr or higher up to about 1 torr) to prepare it for leak test (atmospheric background of trace gas is reduced to tolerable levels), pass a trace gas over the suspected leak in such a manner that if a leak is present the trace gas will enter the test port in an amount or at a rate corresponding to leak size. The trace gas is conveyed to a mass sensitive instrument for measurement. Generally the instrument is one which requires pumping to high vacuum level (below $10^{-3}$ torr) to avoid degradation and eliminate background trace gas from prior tests. High vacuum pumping means are provided for this purpose. The mismatch between the high vacuum instrument and test port rough vacuum is accommodated by a throttle means or by pumping the test port on to high vacuum when connecting to the mass sensitive instrument. After testing the test port should be isolated to allow changing test specimens.

A roughing valve is connected between the interior test port and the rough pump. In some species the roughing valve is also between test port and mass sensitive instrument and/or high vacuum system. The roughing valve is pilot operated by a solenoid valve.

The roughing valve is in a roughing line of ½ inch or more, preferably 1 inch or more diameter—one large enough to present difficulty to solenoid powered valves sealing against full atmospheric pressure. The roughing valve of the present invention only uses the solenoid for pilot valve purposes. Power comes from the mechanical pump which continuously maintains a roughing line vacuum on the outlet side of the roughing valve.

When the pilot valve is opened, a set of connections is established which presents an atmospheric pressure-rough vacuum pressure differential across a main valving member of the roughing valve and opens it.

An isolation valve blocks connection to the high vacuum zone until an adequate rough vacuum is achieved at the test port. This is automatically controlled by a vacuum measuring gauge. After the isolation valve opens, testing (or high vacuum processing) can begin. After such testing, a manual or automatic control signals the solenoid to close the pilot valve and "drop" the main valving member of the roughing valve to a closed position. Then atmospheric pressure air [2] is admitted to the roughing valve to provide a good seal. A vent valve is opened by the solenoid to also bleed the air to the test port to air release the test port and allow sample changing.

This operation is carried out repetitively over a series of normal cycles. Occasionally, there is a failure of high vacuum due in some cases to high vacuum equipment failures, in other cases to an excessive rate of trace gas entry (corresponding to a discovery of a large leak or breakdown of vacuum sealing conditions at the test site). The exact cause is not known at the time, but the emergency requires protection of the mass sensitive instrument. If the cause is at the test site, operation of the isolation valve means would serve as a remedy. But that would be the worst remedy if the cause is in the high vacuum pumping equipment or if the instrument is already overloaded with rough vacuum level gas load. Therefore the isolation valve is left open and the roughing valve is closed automatically, short of test completion. The mechanical pump is then connected to the instrument and high vacuum pumps to clear them. This connection is also utilized for initial rough pumping of the instrument and high vacuum zone.

The invention is now described in detail with reference to the accompanying drawings wherein FIG. 1 is a schematic diagram of a leak detector apparatus according to the preferred embodiment of the invention.

---

[1] "Connect" as used herein means "place in fluid communication with" as in pipe connections.

[2] "Air" means any suitable gas for "air-releasing" to a full pressure level.

FIG. 1 PARTS

Leak detector apparatus (10) comprising:

(I) A mass spectrometer tuned to detect a trace gas mass (e.g. helium)
(II) The test port (inlet port)
(III) High vacuum pump—an air-cooled 2 inch diffusion pump with a speed of 150 liters per second and a forepressure tolerance of .2 torr
(IV) Roughing mechanical pump
(V) Roughing valve
(VI) Transfer valve
(VII) Test port air release valve
(VIII) Thermocouple vacuum gauge for measuring test port pressure
(IX) Cold cathode vacuum gauge for measuring high vacuum level at (1)

Leak test sampling apparatus 90 for connection to II including any of ($\alpha$) a hooded pre-bombed test port such as a transistor can
($\beta$) a sniffer
$\gamma$ the foreline of a high vacuum pump of a vacuum system being probed
$\Delta$ direct connection to the chamber of the vacuum system.

FIG. 2 PARTS

AC–PS—unregulated standard industrial alternating current power supply
CB—circuit breaker
S1—a switch for control of the leak detection operation having positions (1) (2) (3)
K2—a direct current time delay drop out relay with rectifier diode and a resistance element (equal in value to relay coil resistance operating contacts K2A, K2B, K2C)
Coil V, the operator of the roughing valve
Coil VI, the operator of the transfer valve
Coil VII, the operator of the air release valve
K VIIA, B, relay contacts operated by vacuum gauge VIII
K IX A, a relay contact operated by vacuum gauge IX
L, other loads including pumps, gauges, and electronic control power supplies and motors.
P, a light indicating that rough pumping is in progress
T, a test light indicating that the system is ready for testing

FIGS. 3, 3A, 3B, 3C

Figure 3:
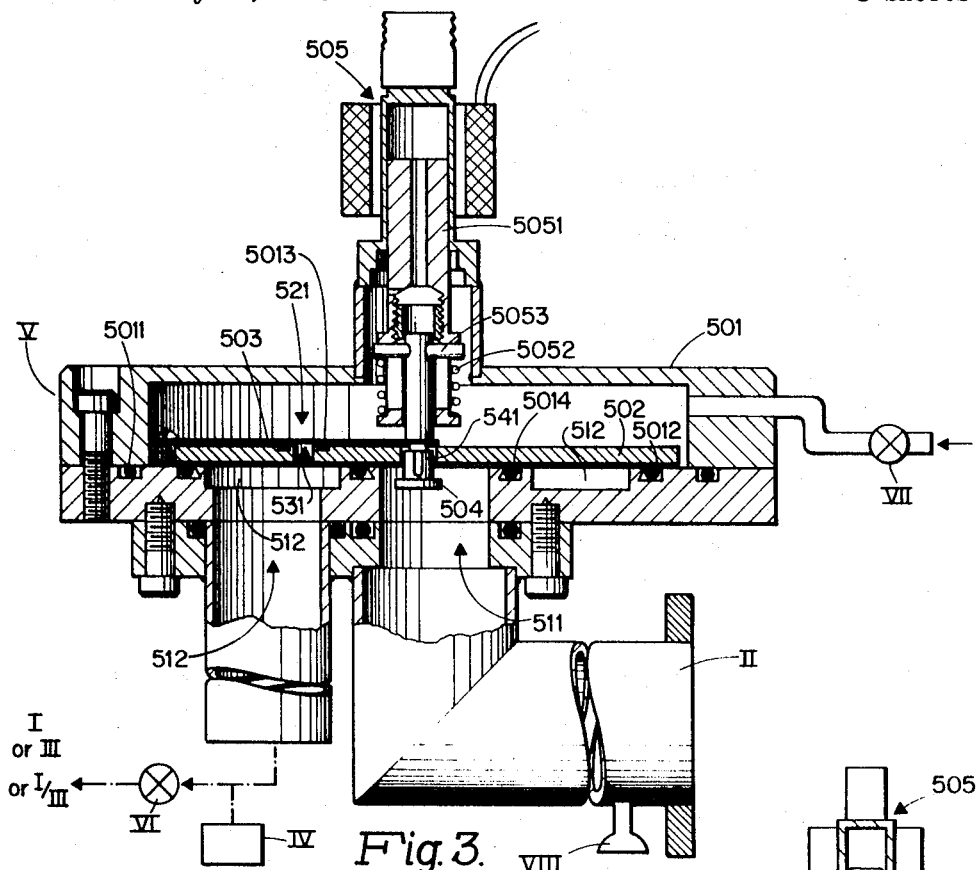
FIG. 3 is a cross-sectional view of the roughing valve of the FIGS. 1–1A–1B apparatus.

Referring now to FIG. 3 the roughing valve V comprises:

(1) a valve body 501 which forms a vacuum tight enclosure except for an "inlet" opening 511 connected to test port II and an "outlet" opening 512 connected to roughing pump IV and to I/III via VI. The outlet port has the form of an annulus concentrically surrounding the inlet port;

(2) a main valving member 502 within the valve body. The member has the form of a disc and forms with the cylindrical side walls and top plate of the body a substantially closed ballast volume 521;

(3) a pilot valve 503 in the form of a leaf spring normally obturating a pilot valve opening 531, in the valving member, lined up with opening 512;

(4) a venting valve 504 in the form of crossing ribs and an end disc for obturating a venting valve opening 541, in the valving member, lined up with opening 511, and (5) a solenoid actuated operator 505.

Figure 3B:
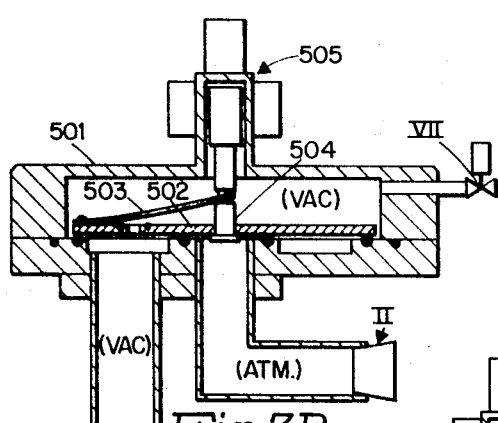
FIGS. 3A–3C are simplified versions of FIG. 3 illustrating different valving positions.
Figure 3A:
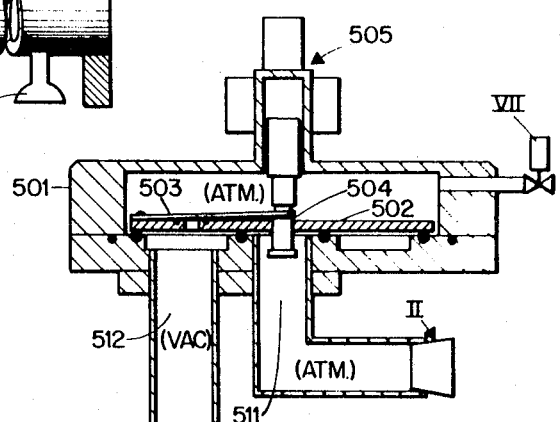
Figure 3C:
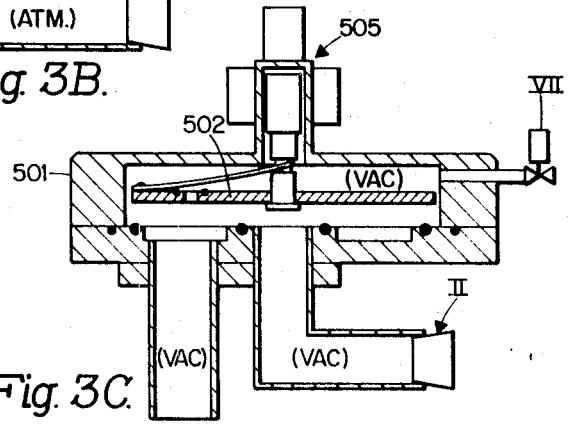

Certain further details of structure and of operation now described should be reviewed with continuing reference to FIG. 3 and also to FIGS. 3A, 3B, 3C.

The valving member 502 is arranged to move in a vertical direction so that it can drop by gravity to the sealing posion shown in FIG. 3. The air release valve VII is connected to the ballast volume 521 so that the differential in air pressure can aid in providing reliable valve sealing; the pressure differential is atmospheric pressure above valving member 502 and rough vacuum pressure in annular port 512 for all around even sealing pressure on the valving member. In the closed position of valving member 502, vent valve 541 is open to bleed air to test port II to "air-release" it and allow changing of test connections between leak detection runs. Meanwhile pilot valve 503 is closed to keep the rough pump IV from pumping on the ballast volume.

Atmospheric pressure differential is also used to aid in valve opening. Air release valve VII is closed and solenoid 505 is operated to close venting valve 504 (the bottom disc portion of 504 blocking opening 541) and simultaneously open pilot valve 503 (lifting the leaf spring to pivot it about a fixed outer point on the valving member). The effect of these changes of the pilot and vent valve positions is to allow rough pump IV, and/or the roughing line vacuum, per se, to quickly pump down the ballast volume (which has a total volume less than the per second effective pumping speed at pilot opening 531). The pressure differential between test port II and the ballast volume then cooperates with the lifting action of the solenoid to lift valving member 502.

The valving member need not go all the way to the top of the body. It can be so designed, but it is preferable to leave a residual ballast volume 521 in the open position of the valving member. A small annular clearance, e.g. preferably .010 inch for a one inch disc is provided between 502 and 501 to gradually equalize pressure differential during lifting and prevent a violent lifting action or bounce. At the top of the valve lifting motion, the disc part of valve 504 holds up valving member 502.

The central armature 5051 of solenoid moves up when the coil is activated and only has an initial load, the compression of spring 5052. This avoids electrical overloading. After armature 5051 reaches a top position fully within the coil, the spring pushes against arms 5053 to lift the vent valve 504. Full field strength of the solenoid working on an armature at rest is available for holding the valving member 502 in its upper position after it lifts. The lifting action is provided by the spring 5052 and the pressure differential across 502 described above. When the valve is to be closed, current to the solenoid coil is interrupted, the valving member 502 drops to its closing position, vent valve 504 is opened and pilot valve 503 is simultaneously closed. Then air release valve VII (whose operation has been delayed to this point) is operated to complete the sealing and "air-release" test port II via opening 541.

The valve body includes upper and lower portions sealed together with an annular vacuum gasket 5011. Sealing-off of outlet 512 is provided by annular gasket 5012. The necessary vacuum sealing action of pilot valve 503 is provided by gasket 5013 mounted in disc 502. Vent valve 504 does not require a similar vacuum sealing function and therefore does not require a gasket. But separation of the pressure of the inlet opening from the outlet opening is necessary and this seal is provided by gasket 5014. Conventional gaskets are also provided at the inlet and outlet lines which are demountably connected to the valve body at openings 511 and 512, respectively.

The gasket 5012 concentrically surrounds the gasket 5014 and the gasket 5011 concentrically surrounds the gasket 5012. All three gaskets are accommodated in the lower plate of the two piece valve body.

The valve construction as a whole thus needs only a very small height and provides simplicity and economy of construction, consistent with effective and reliable performance of its several functions described herein.

For a summary recapitulation of operation of valve V note FIGS. 3A, 3B, 3C wherein the legend "VAC" indicates rough vacuum level of pressure ($10^{-3}$ to 1 torr) and "ATM" indicates atmospheric, or equivalent pressure.

FIG. 3A indicates the initial (or final) valve position. FIG. 3B indicates the beginning of valve opening and FIG. 3C indicates the completion of valve opening. Closing is essentially a reversal of this sequence with the difference that the valve body will re-seat itself before the inlet line (test port II) is released to atmospheric pressure.

FIG. 2 OPERATION

With the foregoing introduction to the leak detector system, its operation can now be described with particular reference to the portion of the apparatus handled by the operator—the control circuit of FIG. 2, with occasional reference to other figures.

Assume that switch CB is closed. Roughing valve V (FIG. 1) is closed.

Begin with a desire to be sure that the test port is air released. To this end, push switch S1 to position (1). Current then flows through the electric operator VII of the air release valve and it opens. This can be a momentary hold. More will be said about air release below, but for now, take the switch back to stanby position (2). Then the air release valve is no longer powered and therefore closes. Current does now flow through the electric operator VI of the transfer valve and it opens. Current also flows through relay K2 to operate it, thus closing contacts K2A and opening contacts K2B and K2C.

Figure 1:
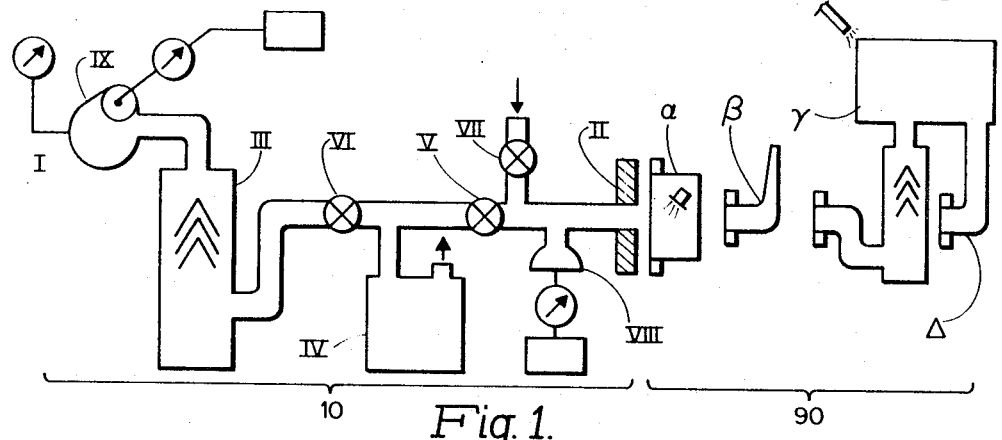
FIGS. 1A–1B are variations of the FIG. 1 diagram indicating other embodiments of leak detector apparatus.
FIG. 1C shows the rough pumping sub-assembly, which is common to the FIG. 1, 1A and 1B embodiments.

Connect a specimen to be tested to test port II (see FIG. 1).

Now throw the switch to position (3) for pumpdown and test. The operator of valve VI is de-energized and the valve closes. Relay K2 is de-energized and after a pre-set time delay, contacts K2A reopen and contacts K2B, K2C reclose. This provides current to operate roughing valve V (specifically to operate its solenoid 505—FIG. 3) to open it while the delay allows valve VI to close first. This also energizes light P which indicates to the operator that pumpdown is in progress. When the proper level of rough vacuum is achieved, thermocouple vacuum gauge VIII operates to open contacts KVIIIB and close KVIIIA. This provides current via the S1A contacts to reopen valve VI to connect the test port to the mass spectrometer. This also energizes relay K2 again to close contacts K2A to turn on light T—a test light which indicates that leak testing can begin—and open contacts K2C to turn off light P and disarm the air release operator VII.

Leak testing is carried out in the conventional manner. Then the operator air releases the test port by switching S1 back to position (1) or puts it on standby by switching back to position (2). If it is air-release, note that switching S1 to position (1), de-energizes valve V—it closes, and turns off the test light. The above mentioned delay mechanism of relay K2 (which can be supplemented by a mechanical delay in moving S1 from position (2) to (1) or a corresponding electric delay means) initially retards energizing of coil VII (by delaying K2C closing) but then, after a total delay of about 0.5 second, allows air-release after valve V has closed. As air release raises pressure, the thermocouple gauge operated contacts (KVIIIA, B) return to their initial settings shown in FIG. 2.

During air release there is heavy (in relation to rough pump capacity) leakage across gaskets 5012 and 5014 until sufficient sealing force is built up by adequate pressure rise in the ballast volume 521 (about half an atmosphere of pressure where IV is a 1.7 c.f.m. pump and exit 512 is a ¾ inch port necked down to a ¼ inch line leading to pump IV and the foreline of III). During this leakage time valve VI must be closed to keep the leak from reaching the diffusion pump and causing excessive forepressure. That delay is accomplished by the above mentioned delay in moving switch S1 to (1).

A related problem would arise if switch S1 is moved from position (1) back to (2) before completion of air release. Valve VI must remain closed in such a situation. This contingency can be avoided by delay of the operator at position (1) for at least about 1–2 seconds or modifying switch S1 to provide a dash pot or other mechanical or electrical delay in leaving the air release position.

To summarize the valve VI must close or remain closed whenever pressure at the valve is likely to exceed for pressure tolerance of pump III.

Assume now that the operator's movement of switch S1 was back to position (2). This leaves relay K2 energized but causes closure of valve V and test light T. From standby, the operator can go back to position (3) for immediate retest or to position (1) for air release.

The above describes normal operation.

Assume now a harmful over-pressure condition indicated by ionization gauge IX (see FIG. 1). This closes contact KIXA and opens KIXB. If it occurs during pumpdown, valve VI opens and valve V closes. If it occurs during test, valve V closes (valve VI is open) if the overpressure condition causes corresponding over-pressure condition to be sensed at VIII. If it occurs during standby or air-release, valve VI stays open and valve V stays closed.

Assume now an over-pressure condition at the test port (only) sensed by thermocouple gauge VIII. By definition it can't happen during air-release or during pumpdown and if it happens during standby no action is needed, other than an indication on the gauge's meter. If it happens during test, valve VI will close to protect the mass spectrometer and the test light turns off as contacts K2A re-open. The operator, thus alerted, can switch S1 back to standby position to close valve V and re-open valve VI for fore-pumping of the pump III by IV. Meanwhile valve V stays open to let IV keep pumping against the load to attempt a cure of the over-pressure condition.

VARIATIONS—FIGS. 1A, 1B, 1C

Figure 1A:
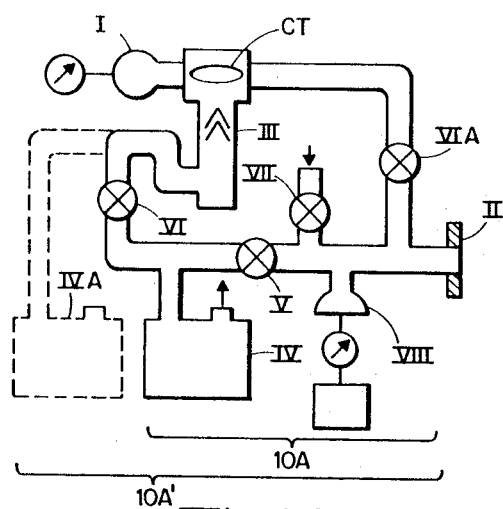

The dark line species shown in FIG. 1A is a conventional leak detector (with the trace gas sample admitted to the diffusion pump inlet via a cold trap (T)) utilizing the same vacuum system as FIG. 1 and FIG. 3 with the addition of a slow opening test valve VIA. The further alternative embodied in the dashed line addition of a second mechanical pump IVA eliminates the need for isolation valve VI and the line portion containing it. Another usage of the FIG. 1A dark line system would be as a standard pumping system with a load such as a television tube connected to test port II. A further variation of the leak test usage of the apparatus is indicated with the addition of line portion TLA and removal of TL.

Figure 1B:
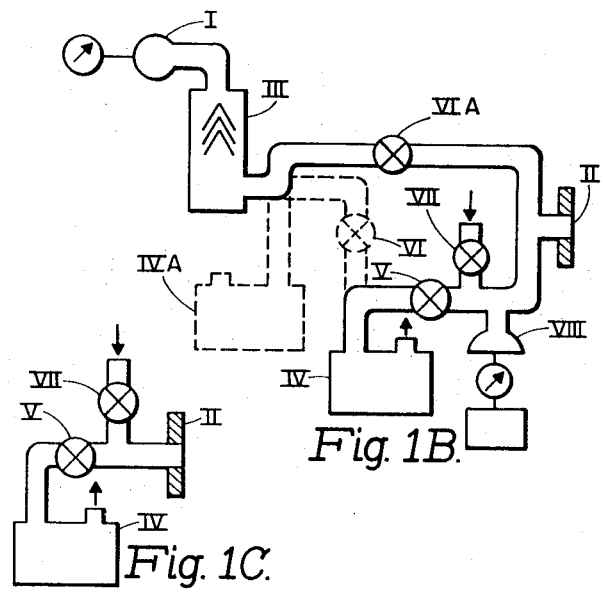

FIG. 1B shows in solid portion the leak detector system of FIG. 1 employing a test valve VIA (as in FIG. 1A) and, in dashed lines shows the alternatives of the possible use of isolation valve VI to let pump IV back III or the addition of a separate backing pump IVA.

Figure 1C:

FIG. 1C shows the application of a portion of the pumping apparatus applied to the straight forward task of mechanical pumping some gas load applied to inlet (test) port II.

Figure 2:
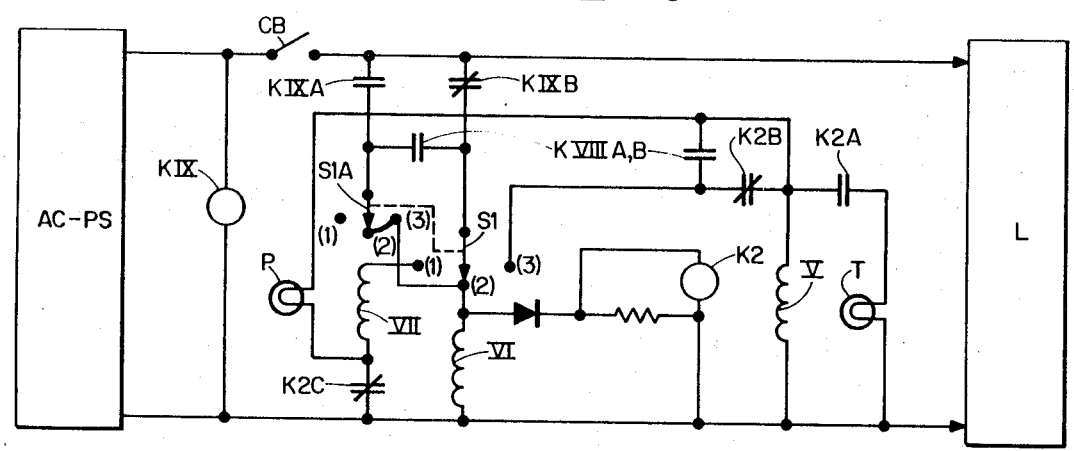
FIG. 2 is an electrical circuit diagram indicating the controls for the FIG. 1 apparatus and FIGS. 2A–2C are other species of the controls.

In the variations described above, appropriate changes of the control circuit of FIG. 2 will be apparent to those skilled in the art.

FIG. 2A–B, FIG. 2C

Figure 2A:
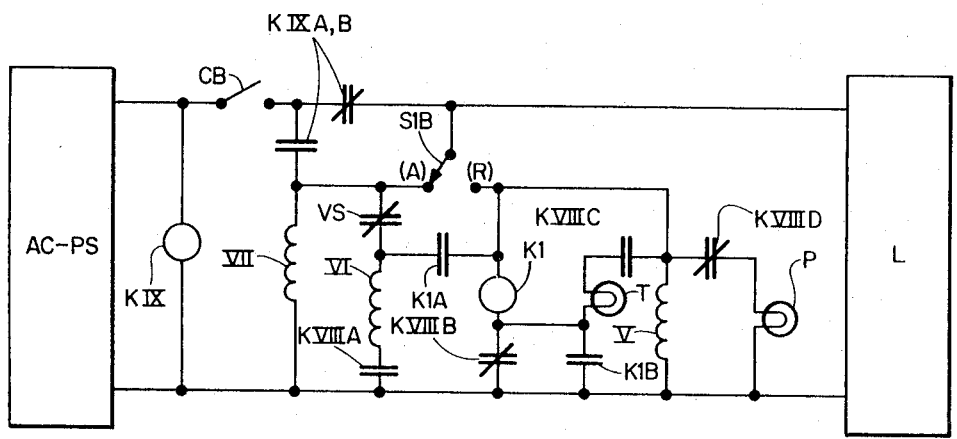
Figure 2B:
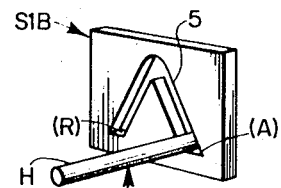
Figure 2C:
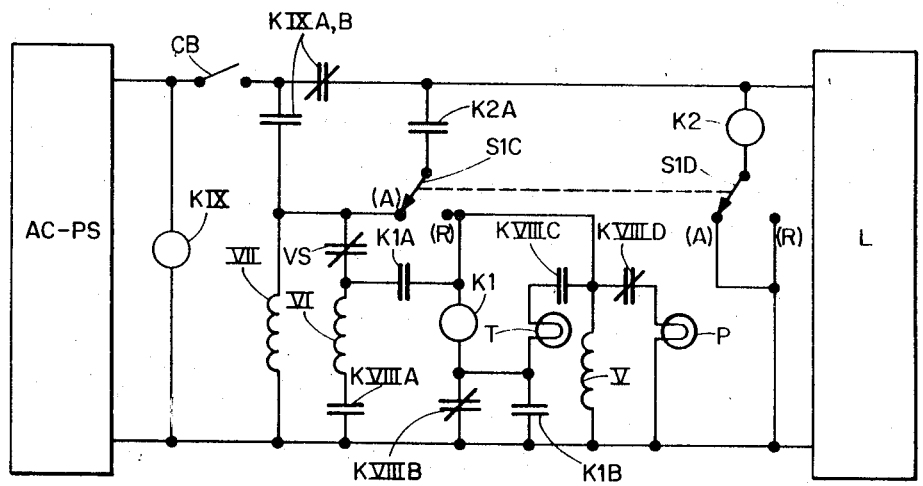

Other species of the electrical control suitable for FIG. 1 (and, with obvious modifications for the FIG. 1A, 1B, 1C variations) are shown in FIGS. 2A and 2C.

Referring to FIG. 2A, the circuit contemplates two positions for the operator who can throw switch S1B to (A) for air-release and loading and unloading of test fixtures at test port II or to (R)—run—for pumpdown and test. The thermocouple gauge VIII is located near the pump IV (rather than near test port II—nevertheless it responds to pressure at test port II when valve V is open) and an additional vacuum switch VS is provided at test port II, the vacuum switch being a simple bellows or diaphragm contact maker or breaker of the type commonly used in automotive industry and set for switching (closing) at or above 10 p.s.i. absolute. A simple relay K1 is added for latching onto a connection in response to an instant signal as described below.

The thermocouple vacuum gauge operated relay VIII has four sets of contacts KVIII A, B, C, D.

The convention for all open and closed relay contacts here as in the other circuit diagrams is that the drawing shows the contacts in the position they take when no current flows through their electrical operator. Similarly current must flow through valve operators V, VI, VII to open their respective valves which are otherwise closed. The position shown for contacts operated by VS or VIII is high pressure position and for KIX A, B, low pressure position.

FIG. 2B schematically shows the switch S1B used in FIG. 2A. It comprises a switch handle H pivoted at P and passing through a guide slot in a plate, the guide having the form of an inverted V. Micro-switches (not shown) providing contacts for the (A) and (R) switching positions are arranged at the ends of the V legs. Because of the V shape, the handle H cannot rest between (A) and (R) but must fall to one position or the other and it can be spring loaded to insure this result; yet the inherent delay in moving through a multi-direction path from (A) to (R) makes the switch fool-proof against too quick operation.

The operation of FIGS. 2A–B can now be described. Assume that the operator throws switch S1B to position (R). Then valve VI would close if not already closed due to open contacts VS. Valve VII would also close and valve V would open and pumping light P would light up. The position shown for contacts operated by VS or VIII is high pressure position and for KIX A, B, low pressure position.

When pumpdown caused test port pressure to reach a low enough level, contacts VS open. At a still lower pressure vacuum gauge VIII relay operator would close contacts KVIII A, C and open B, D. Contacts KIA, KIB also close. Thus the pump light goes out, test light T comes on, valve VI opens and testing can begin.

After testing (or before completion of testing) the operator may wish to air-release the test port (or in any event to close valve V, recognizing that test port II will thereby be air-released). He throws switch S1B back to position (A). Breaking contact at (R) shuts off light T and closes valve V. Relay KI is held by current passing through the closed contacts of VS; contacts KIA, KIB stay closed. Making contact at (A) opens valve VII (after enough delay for valve disc V to close). But valve VI will not open until pressure measured by VS rises to 10 p.s.i. and closes contacts VS. This gives assurance of adequate sealing pressure on valve V to allow opening of valve VI without exposing pump III to excessive forepressure. As supplementary protection contacts KVIIIA will open if there is nevertheless a high pressure at the inlet of pump IV, thus preventing opening of valve VI.

FIG. 2C shows use of an electrical switch S1D gauged to a conventional switch S1C and operating a time delay relay K2. Contacts K2A control current through control switch S1C thereby providing a foolproof control of valve VI, during air-release (via VII) and sealing of valve V, by electrical rather than mechanical means. The electrical delay means of K2 are not shown but are part of the K2 device and commercially available. The FIG. 2C control, like that of FIG. 2A–B has no standby position.

A standby position, as in the FIG. 2 control is particularly useful where the test fixture is a large vacuum system, e.g. γ of FIG. 1.

In vacuum systems using a very large valve V, e.g. with a 10 inch disc, the weight of the valve will generally be enough to provide sealing without providing time delay controls to hold off opening of valve VI until air-release pressure builds up in the ballast volume of valve V. But it will still be necessary to insure that valve V closes before air-release and before valve VI is opened.

Still further embodiments or variations of the combination and subcombinations described above, and including other uses, will be apparent from the above disclosure. It is therefore intended that the above disclosure shall be read as illustrative and not in a limiting sense.

What is claimed is:

1. Leak detector apparatus comprising, in combination:
   (I) species sensitive high vacuum gas analysis means for detecting a trace gas;
   (II) test port means for connection to a potential source of trace gas indicative of a leak;
   (III) high vacuum pumping means connected to said gas analysis means;
   (IV) rough vacuum pumping means connected to said test port means;
   (V) roughing valve means connected between said test port and means and said gas analysis and said rough pumping means and constructed and arranged with respect thereto for selectively isolating said test port from said gas analysis and rough pumping means and comprising (1) valve body means forming a closed chamber with an inlet opening connected to said test port means and an outlet opening connected to said gas analysis and rough pumping means, (2) main valving member means located within the chamber of said valve body and constructed and arranged within said chamber to block both said openings in a first closed position and to clear both said openings in a second open position and to form with said chamber a ballast volume at least when the valving member is in said first position and to respond to differential pressure between said ballast volume and the openings for sealing, (3) pilot valve means for selectively connecting the inlet opening to the ballast volume, (4) venting valve means for selectively connecting the outlet opening to the ballast volume, (5) roughing valve operator means for simultaneously operating said pilot and venting valves in opposite opening-closing senses;
   (VI) transfer valve means connected between said gas analysis means and test port means and arranged to selectively isolate said gas analysis means even when said roughing valve means are open; and
   (VII) means for air releasing the test port including means for admitting gas to the ballast volume to provide sealing pressure.

2. The apparatus of claim 1 wherein the gas analysis means is connected to the high vacuum end of a high vacuum pump forming part of the high vacuum pump means with the rough vacuum outlet of said high vacuum pump being connected to said test port via said transfer valve.

3. The apparatus of claim 2 wherein the rough vacuum pumping means comprises a rough vacuum pump with its pumping inlet connected between said roughing and transfer valves and comprising means responsive to test port pressure for automatically operating said roughing and transfer valves so that the gas analysis means is connected to the test port and to the high vacuum pump via said valves only when the rough pumping means reduces the test port pressure to a preset low value.

4. The apparatus of claim 1 further comprising means responsive to test port pressure for automatically operating said transfer valve so that said valve begins to open to connect said gas analysis means and that port only when the rough pumping means reduces test port pressure to a preset low value.

5. The apparatus of claim 4 wherein the rough vacuum pumping means is arranged in the apparatus to perform the function of backing pump for high vacuum pumping means in addition to its primary function of pumping on the test port and when the roughing valve is closed.

6. The apparatus of claim 3 constructed and arranged to automatically shut the roughing valve when the pressure exceeds to a preset value.

7. The apparatus of claim 3 further comprising means responsive to pressure in the gas analysis means to cut-off communication between the gas analysis and test port means while continuing the pumping connection between the gas analysis, high vacuum pumping and rough pumping means.

8. The apparatus of claim 1 wherein said air release means is connected to the ballast volume of the roughing valve and air releases the test port via the pilot valve.

9. Leak detector apparatus comprising in combination:
(I) high vacuum mass spectrometer means for detecting a trace gas
(II) test port means for connection to a potential source of trace gas indicative of a leak
(III) high vacuum pumping means comprising a diffusion pump with its high vacuum inlet connected to said mass spectrometer means
(IV) rough vacuum pumping means comprising a mechanical roughing pump with its rough vacuum inlet connected to said test port means
(V) roughing valve means connected between the rough vacuum outlet port of said diffusion pump and said test port means and between said test port and rough vacuum pumping means for selectively isolating said mass spectrometer and rough pumping from said test port means and comprising (1) valve body means forming a closed chamber with a lower flat wall which has an inlet opening connected to said test port means and an outlet opening connected to said rough pump means, the outlet opening surrounding the inlet opening, (2) a valve disc located within the chamber of (1) and constructed and arranged within said chamber to seat against said lower flat wall to block both said openings in a first closed position and to clear both said openings in a second open position and to form with said chamber a ballast volume in said first and second positions and to respond to differential pressure between said ballast volume and the openings for movement and sealing, the valve disc being arranged to narrowly clear side walls of the valve body to provide a delayed air bleed from one side to the other thereby reducing the rate of pressure equalization, (3) pilot valve in said disc for selectively connecting the inlet opening to the ballast volume, (4) a venting valve in said disc for selectively connecting the outlet opening to the ballast volume, (5) a solenoid valve operator linked to said pilot and venting valves and arranged for simultaneously operating said pilot and venting valves in opposite opening-closing senses,
transfer valve means connected between the diffusion pump outlet and test port and between the high vacuum and rough pump means and arranged to selectively isolate the mass spectrometer and high vacuum pumping means even when the roughing valve means are open, and
means for air releasing the test port including means for admitting air to the ballast volume of the roughing valve.

10. Rough vacuum pumping apparatus comprising in combination:
(II) inlet port means for connection to a system to be evacuated
(IV) rough vacuum pumping means connected to said inlet port means via
(V) roughing valve means which comprise
(1) valve body means forming a closed chamber with an inlet opening connected to said inlet port means and an outlet opening connected to the rough vacuum pumping means, (2) main valving member means located within the chamber of (1) and constructed and arranged within said chamber to block both said openings in a first closed position and to clear both said openings in a second open position and to form with said chamber a ballast volume at least when the valving member is in said first position and to respond to differential pressure between said ballast volume and the openings for movement and sealing, (3) pilot valve means for selectively connecting the inlet opening to the ballast volume, (4) venting valve means for selectively connecting the outlet opening to the ballast volume, (5) roughing valve operator means for simultaneously or sequentially operating pilot and venting valve in opposite-opening-closing senses, and
(VII) means for air releasing the inlet port including means for admitting gas to the ballast volume.

11. The apparatus of claim 10 in combination with:
(III) a high vacuum pumping means, and
(VI) transfer valve means connected between said inlet port and high vacuum means and arranged to isolate said high vacuum components event when the roughing valve is open.

12. The apparatus of claim 10 in combination with:
(I) a high vacuum chamber,
(III) a high vacuum pumping means connected to said high vacuum chamber I,
(VI) transfer valve means connected between said inlet port and high vacuum means and arranged to isolate said high vacuum components even when the roughing valve is open.

13. The apparatus of claim 11 wherein the rough vacuum pumping means is arranged in the apparatus to perform the function of backing pump for the high vacuum pumping means in addition to its primary function of pumping on the inlet port.

14. The apparatus of claim 11 further comprising:
(VIII) means responsive to inlet port pressure to shut the transfer valve when inlet pressure exceeds a preset value.

15. A vacuum valve operated at least in part through line suction and comprising:
(1) valve body means forming a closed chamber with an inlet opening for connection to atmosphere and an outlet opening for connection to a vacuum pump,
(2) main valving member means located within the said chamber and constructed and arranged within said chamber to block both said openings in a first closed position and to clear both said openings in second open position and to form with said chamber a ballast volume at least when the valving member is in said first position and to respond to differential pressure between said ballast volume and the openings for movement and sealing,
(3) pilot valve means for selectively connecting the inlet opening to the ballast volume,
(4) venting valve means for selectively connecting the outlet opening to the ballast volume,
(5) roughing valve operator means for simultaneously operating said pilot and venting valves in opposite opening-closing senses.

16. The valve of claim 15 with an air release valve connected to the ballast volume.

17. The valve of claim 16 wherein the outlet port is annular and surrounds the inlet port.

18. The valve of claim 17 wherein the valve member is a disc and the valving member comprises an annular body surrounding the disc with a narrow clearance, the vent and pilot valves being within the disc.

19. The valve of claim 18 comprising control means constructed and arranged to close the valve prior to admitting air to the ballast volume.

References Cited

UNITED STATES PATENTS

| | | | |
|---|---|---|---|
| 3,416,359 | 12/1968 | Durbin et al. | 73—40.7 |
| 3,486,365 | 12/1969 | Briggs | 73—40.7 |

LOUIS R. PRINCE, Primary Examiner

W. A. HENRY II, Assistant Examiner

U.S. Cl. X.R.

251—30, 129